US010450886B2

(12) United States Patent
Sennoun (10) Patent No.: US 10,450,886 B2
(45) Date of Patent: Oct. 22, 2019

(54) HYBRID PROPULSION SYSTEM INCLUDING A CHEMICALLY RECHARGEABLE ULTRA-CAPACITOR

(71) Applicant: General Electric Company, Schenectady, NY (US)

(72) Inventor: Mohammed El Hacin Sennoun, West Chester, OH (US)

(73) Assignee: General Electric Company, Schenectady, NY (US)

( * ) Notice: Subject to any disclaimer, the term of this patent is extended or adjusted under 35 U.S.C. 154(b) by 787 days.

(21) Appl. No.: 14/977,694

(22) Filed: Dec. 22, 2015

(65) Prior Publication Data
US 2017/0175565 A1    Jun. 22, 2017

(51) Int. Cl.
| *F02K 5/00* | (2006.01) |
| *F02C 6/14* | (2006.01) |
| *F01D 15/10* | (2006.01) |
| *F02K 3/06* | (2006.01) |
| *F02C 6/10* | (2006.01) |

(52) U.S. Cl.
CPC ............. *F01D 15/10* (2013.01); *F02C 6/10* (2013.01); *F02C 6/14* (2013.01); *F02K 3/06* (2013.01); *F02K 5/00* (2013.01); *F05D 2220/36* (2013.01); *F05D 2260/4031* (2013.01); *F05D 2260/42* (2013.01)

(58) Field of Classification Search
CPC .... F02K 3/06; F02K 5/00; F02C 7/268; F02C 7/275; F02C 6/14; F01D 15/10; F05D 2220/36; F05D 2260/42
See application file for complete search history.

(56) References Cited

U.S. PATENT DOCUMENTS

| 6,794,080 | B2 * | 9/2004 | Sennoun | H01M 8/1007 |
| | | | | 361/502 |
| 7,252,165 | B1 | 8/2007 | Gruenwald et al. | |
| 7,818,969 | B1 * | 10/2010 | Hotto | H01M 8/0618 |
| | | | | 60/780 |
| 8,860,236 | B2 | 10/2014 | Nasiri | |
| 2004/0137317 | A1 | 7/2004 | Sennoun et al. | |
| 2005/0033535 | A1 * | 2/2005 | Verbrugge | G01R 31/3651 |
| | | | | 702/63 |
| 2008/0132127 | A1 * | 6/2008 | Jansen | B63B 35/73 |
| | | | | 440/1 |

(Continued)

FOREIGN PATENT DOCUMENTS

JP    2013-514494 A    4/2013

OTHER PUBLICATIONS

Machine Translation and Notification of Reasons for Refusal issued in connection with corresponding JP Application No. 2016-242829 dated Dec. 26, 2017.

(Continued)

*Primary Examiner* — William H Rodriguez
(74) *Attorney, Agent, or Firm* — Dority & Manning, P.A.

(57) ABSTRACT

An aeronautical propulsion system includes a fan having a plurality of fan blades and an electric motor drivingly connected to the fan for rotating the plurality of fan blades. A chemically rechargeable ultra-capacitor is included for providing the electric motor with a substantially continuous flow of electric energy during operation of the chemically rechargeable ultra-capacitor, resulting in a more efficient aeronautical propulsion system.

20 Claims, 5 Drawing Sheets

(56) References Cited

U.S. PATENT DOCUMENTS

| | | | |
|---|---|---|---|
| 2009/0293494 A1* | 12/2009 | Hoffjann | B64D 27/02 60/780 |
| 2010/0083632 A1 | 4/2010 | Foster et al. | |
| 2010/0305792 A1 | 12/2010 | Wilk et al. | |
| 2012/0049009 A1 | 3/2012 | Kissel, Jr. | |
| 2012/0087792 A1* | 4/2012 | Cousineau | F03D 7/0224 416/1 |
| 2013/0006457 A1* | 1/2013 | Anders | E02F 9/2075 701/22 |
| 2013/0206490 A1* | 8/2013 | Kouvo | B60L 9/12 180/65.1 |
| 2014/0084817 A1 | 3/2014 | Bhavaraju et al. | |
| 2014/0103158 A1 | 4/2014 | Berry | |
| 2014/0260306 A1 | 9/2014 | Dooley et al. | |
| 2015/0322864 A1 | 11/2015 | Dooley et al. | |
| 2016/0257416 A1* | 9/2016 | Himmelmann | B64D 27/02 |
| 2017/0225573 A1* | 8/2017 | Waltner | B60L 11/14 |
| 2017/0225794 A1* | 8/2017 | Waltner | F01D 15/12 |
| 2017/0349050 A1* | 12/2017 | Ambrosio | B60L 11/1803 |

OTHER PUBLICATIONS

Extended European Search Report and Opinion issued in connection with corresponding EP Application No. 16203096.9 dated May 17, 2017.

* cited by examiner

HYBRID PROPULSION SYSTEM INCLUDING A CHEMICALLY RECHARGEABLE ULTRA-CAPACITOR

FIELD OF THE INVENTION

The present subject matter relates generally to a hybrid aeronautical propulsion system.

BACKGROUND OF THE INVENTION

A gas turbine engine generally includes a fan and a core arranged in flow communication with one another. The core of the gas turbine engine generally includes, in serial flow order, a compressor section, a combustion section, a turbine section, and an exhaust section. In operation, at least a portion of air over the fan is provided to an inlet of the core. Such portion of the air is progressively compressed by the compressor section until it reaches the combustion section. Fuel is mixed with the compressed air and burned within the combustion section to provide combustion gases. The combustion gases are routed from the combustion section through the turbine section to drive one or more turbines within the turbine section. The one or more turbines within the turbine section may be coupled to one or more compressors of the compressor section via respective shaft(s). The combustion gases are then routed through the exhaust section, e.g., to atmosphere.

It would be beneficial to be able to augment the mechanical energy provided to the fan from the core with an efficiently produced electrical power. While traditional ultra-capacitors are capable of providing a short burst of energy, they are less capable of providing a sustained amount of energy. After discharging a stored amount of energy, traditional ultra-capacitors must subsequently be recharged from an electrical source before providing additional electrical energy.

Accordingly, a system for providing electrical power to, e.g., a fan, of the gas turbine engine would be useful. More particularly, a system for providing a substantially continuous amount of electrical power to one or more components of the gas turbine engine would be particularly beneficial.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, a gas turbine engine is provided. The gas turbine engine includes a core engine, a fan mechanically coupled to the core engine, and an electric motor drivingly connected to at least one of the core engine and the fan. The gas turbine engine also includes a chemically rechargeable ultra-capacitor for providing the electric motor with a substantially continuous flow of electric energy during operation of the chemically rechargeable ultra-capacitor.

In another exemplary embodiment of the present disclosure, an aeronautical propulsion system is provided. The aeronautical propulsion system includes a fan having a plurality of fan blades and an electric motor drivingly connected to the fan for rotating the plurality of fan blades. The aeronautical propulsion system additionally includes a chemically rechargeable ultra-capacitor for providing the electric motor with a substantially continuous flow of electric energy during operation.

In an exemplary aspect of the present disclosure, a method for operating an aeronautical propulsion system is provided. The method includes providing mechanical power to a fan of the aeronautical propulsion system with an electric motor, and providing electrical power to the electric motor with a chemically rechargeable ultra-capacitor.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

Figure 1:
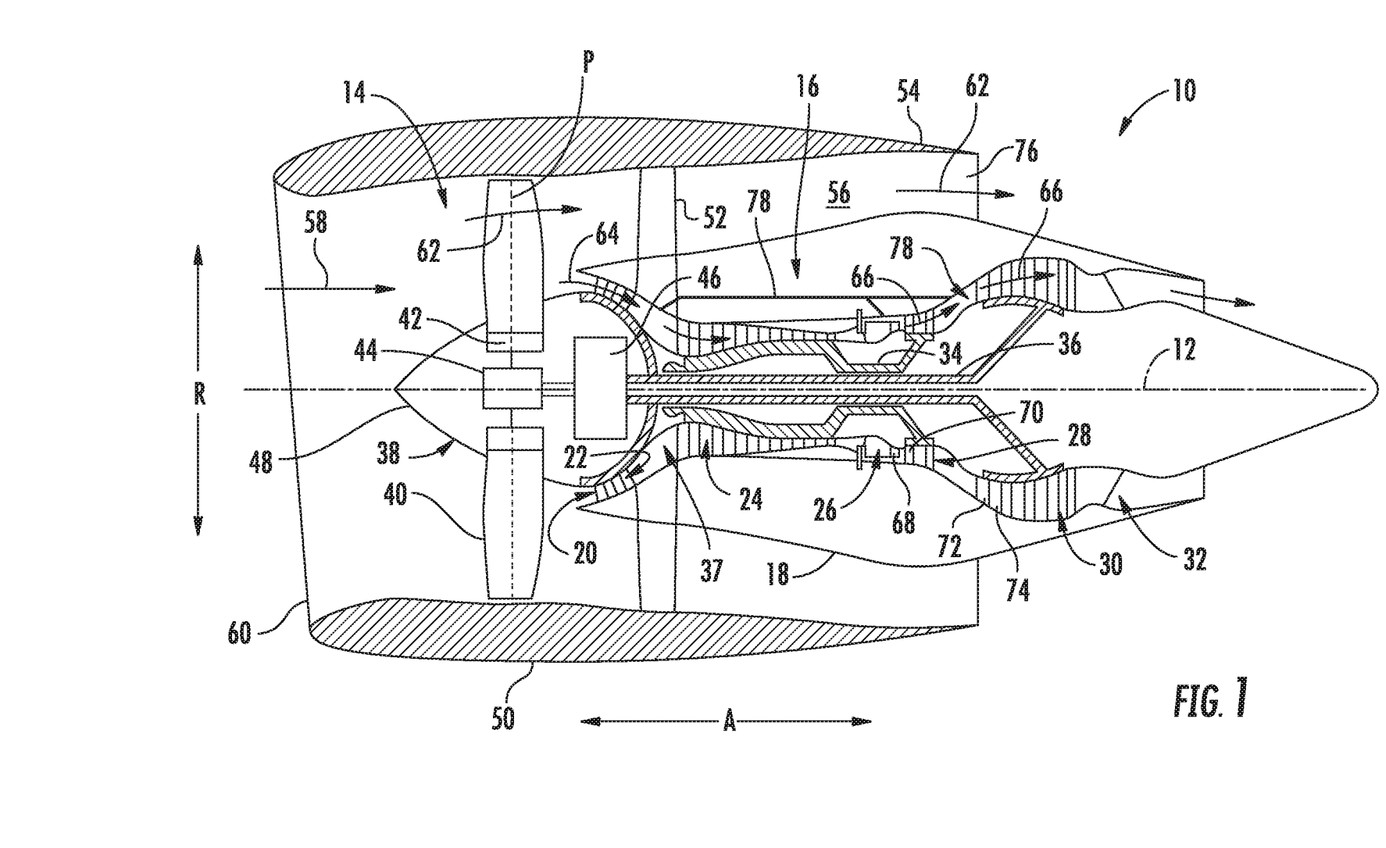
FIG. 1 is a schematic, cross-sectional view of a gas turbine engine in accordance with an exemplary aspect of the present disclosure.

Referring now to the drawings, wherein identical numerals indicate the same elements throughout the figures, FIG.

1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. The compressor section, combustion section 26, turbine section, and nozzle section 32 together define a core air flowpath 37.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable pitch change mechanism 44 configured to collectively vary the pitch of the fan blades 40 in unison. The fan blades 40, disk 42, and pitch change mechanism 44 are together rotatable about the longitudinal axis 12 by LP shaft 36 across a power gear box 46. The power gear box 46 includes a plurality of gears for adjusting the rotational speed of the fan 38 relative to the LP shaft 36 to a more efficient rotational fan speed.

Referring still to the exemplary embodiment of FIG. 1, the disk 42 is covered by a rotatable front hub 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. The exemplary nacelle 50 is supported relative to the core turbine engine 16 by a plurality of circumferentially-spaced outlet guide vanes 52. Moreover, a downstream section 54 of the nacelle 50 extends over an outer portion of the core turbine engine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the core air flowpath 37, or more specifically into the LP compressor 22. The ratio between the first portion of air 62 and the second portion of air 64 is commonly known as a bypass ratio. For the exemplary embodiment depicted, the bypass ratio may be at least about 8:1. Accordingly, the turbofan engine 10 may be referred to as an ultra-high bypass turbofan engine. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

The exemplary turbofan engine 10 depicted in FIG. 1 is configured as an aeronautical gas turbine engine. Aeronautical gas turbine engines, as compared to land-based gas turbine engines, are designed to maximize a power output and efficiency while minimizing an overall weight of the gas turbine engine itself, as well as any required accessory systems.

It should be appreciated, however, that the exemplary turbofan engine 10 depicted in FIG. 1 is provided by way of example only, and that in other exemplary embodiments, the turbofan engine 10 may have any other suitable configuration. It should also be appreciated, that in still other exemplary embodiments, aspects of the present disclosure may be incorporated into any other suitable gas turbine engine. For example, in other exemplary embodiments, aspects of the present disclosure may be incorporated into, e.g., a turboprop engine, a turboshaft engine, or a turbojet engine.

Figure 2:
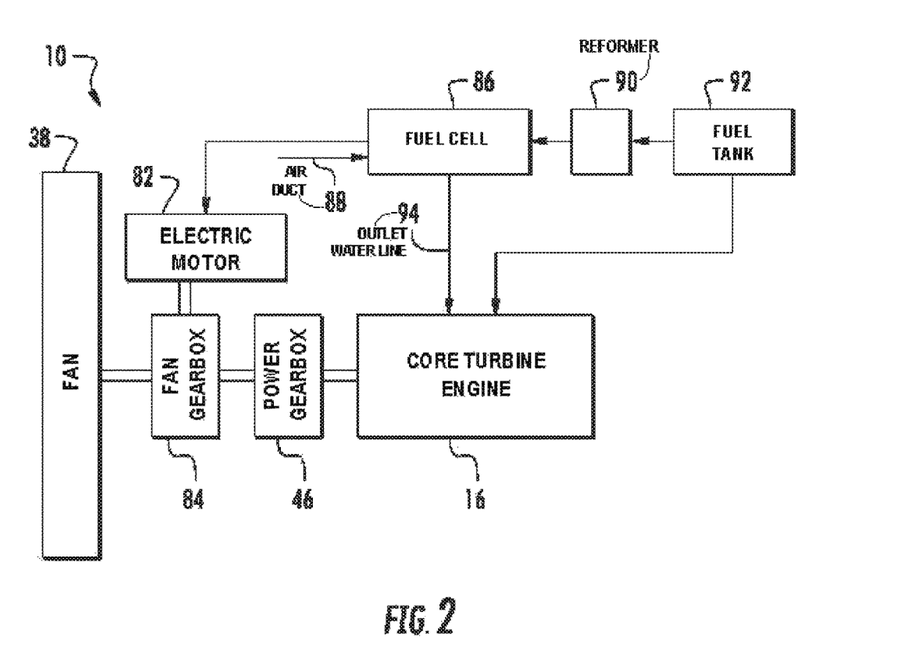
FIG. 2 is a schematic view of a gas turbine engine in accordance with another exemplary embodiment of the present disclosure.

Referring now to FIG. 2, a schematic diagram of an aeronautical propulsion system in accordance with an exemplary embodiment of the present disclosure is provided. For the embodiment depicted, the aeronautical propulsion system is configured as a gas turbine engine, or more particularly, as a turbofan engine 10. As used herein, "gas turbine engine" and "turbofan engine" refer generally to the engine itself, as well as any accessory systems. In certain exemplary embodiments, the turbofan engine 10 may be configured as an ultra-high bypass, geared, ducted turbofan engine 10, similar to the exemplary turbofan engine 10 described above with reference to FIG. 1.

Accordingly, for the exemplary embodiment of FIG. 2, the exemplary turbofan engine 10 generally includes a core turbine engine 16, also referred to herein as simply a turbine engine or core engine, and a fan 38 mechanically coupled to the core turbine engine 16. For the embodiment depicted, the turbofan engine 10 is configured as a geared and ducted turbofan engine, and accordingly includes a power gearbox 46—the core turbine engine 16 being mechanically coupled to the fan 38 through the power gearbox 46—and an outer nacelle assembly (not shown, see FIG. 1) enclosing the fan 38 and at least a portion of the core turbine engine 16.

Referring still to FIG. 2, the exemplary turbofan engine 10 is also configured as a hybrid gas-electric turbofan engine 10. Accordingly, the turbofan engine 10 additionally includes an electric motor 82 mechanically coupled to at least one of the core turbine engine 16 and the fan 38 for at least in part driving at least one of the core turbine engine and fan (i.e., drivingly connected). Specifically, for the embodiment depicted, the electric motor 82 is mechanically coupled to the fan 38 through a mechanical coupling unit 84. The mechanical coupling unit 84 is depicted as being separate and distinct from the power gearbox 46. However, in other exemplary embodiments, the mechanical coupling unit 84 and power gearbox 46 may be combined. The mechanical coupling unit 84 may allow the fan 38 to be driven by the core turbine 16, the electric motor 82, or both. However, typically the mechanical coupling unit will provide for the fan 38 to be driven by one of the core engine 16 or the electric motor 82 at a time. Additionally, in other exemplary embodiments, the electric motor 82 may instead be mechanically coupled to the core turbine engine 16, such as to one or both of an LP shaft or an HP shaft (see FIG. 1).

Further, for the embodiment depicted, the turbofan engine 10 includes a chemically rechargeable ultra-capacitor 86 configured to provide the electric motor 82 with a substantially continuous flow of electrical energy during operation of the chemically rechargeable ultra-capacitor 86. Although a single chemically rechargeable ultra-capacitor 86 is depicted, in other exemplary embodiments, the turbofan engine 10 may additionally include a plurality of chemically rechargeable ultra-capacitors 86 arranged in series flow communication, parallel flow communication, or a combination of series and parallel flow communication. As is discussed below, the chemically rechargeable ultra-capacitor 86 is configured to operate during at least certain operating conditions of the turbofan engine 10. The chemically rechargeable ultra-capacitor 86 may receive a flow of air through an air duct 88 and a flow of fuel, such as hydrogen (i.e., a hydrogen fuel), and utilize such flow of air and fuel to generate electrical power (i.e., may utilize air/O2 and hydrogen as reactants). The flow of air through the air duct 88 may come from, e.g., a bypass passage 56 of the turbofan engine (see FIG. 1), or ram air from a location outside the engine, or any other suitable location. More particularly, as will be discussed in greater detail below with reference to FIGS. 5 through 8, the chemically rechargeable ultra-capacitor may mix hydrogen and air from the air duct 88 to generate a substantially continuous flow of electric energy. For example, the chemically rechargeable ultra-capacitor 86 may provide the electric motor 82 with a substantially continuous flow of conditioned alternating current electrical power during at least certain operating conditions of the turbofan engine 10. As used herein, a "substantially continuous flow" of electrical power refers to a level of continuity sufficient for the electric motor 82 to provide at least one of the fan 38 or core turbine engine 16 with continuous and sustained mechanical power.

Referring still to the embodiment of FIG. 2, the exemplary turbofan engine 10 depicted includes a reformer 90 located upstream of the chemically rechargeable ultra-capacitor 86 for producing a hydrogen fuel for the chemically rechargeable ultra-capacitor 86. With such an exemplary embodiment, the reformer 90 may be in flow communication with a fuel tank 92 of a fuel system of the turbofan engine 10, such that the reformer 90 receives a flow of the same fuel utilized with the core turbine engine 16. Specifically, the fuel system may be configured to provide a first flow of fuel from the fuel tank 92 to the core turbine engine 16 and a second flow of fuel from the fuel tank 92 to the reformer 90. The reformer 90 may receive the second flow of fuel from the fuel system and extract the hydrogen compound from such fuel. The reformer 90 may then provide the chemically rechargeable ultra-capacitor 86 with a flow of hydrogen fuel. Notably, with such an exemplary embodiment, the turbofan engine 10 may be configured to utilize natural gas (NG), liquefied natural gas (LNG), compressed natural gas (CNG), Hydrogen, Liquid Hydrogen, aviation turbine fuel (such as Jet A fuel, Jet A-1 fuel), synthesis gas (i.e., syngas), or a reformate as its fuel.

As stated, the chemically rechargeable ultra-capacitor 86 provides electrical energy to the electric motor 82 during at least certain operating conditions, such that the electric motor 82 may in turn provide mechanical power to at least one of the fan 38 and the core turbine engine 16. In certain exemplary aspects, the chemically rechargeable ultra-capacitor 86 may be configured to provide a substantially constant flow of electric power to the electric motor 82 during a takeoff operating mode and/or a climb operating mode. The takeoff operating mode and climb operating mode may correspond to, e.g., a "full throttle" operating mode wherein an aircraft into which the turbofan engine 10 is installed is taking off or climbing. Additionally, the chemically rechargeable ultra-capacitor 86 may be configured to provide a substantially constant flow of electric power to the electric motor 82 during other operating modes, such as a cruise operating mode. The cruise operating mode may similarly correspond to an operating mode in which the aircraft having the turbofan engine 10 installed therein is cruising.

Regardless of the operating mode, the chemically rechargeable ultra-capacitor 86 generates water as a byproduct during operation. For the embodiment depicted, the exemplary turbofan engine 10 is configured to utilize such water to increase an efficiency of the turbofan engine 16. Specifically, the exemplary turbofan engine 10 is configured to direct the water generated by the chemically rechargeable ultra-capacitor 86 to the core turbine engine 16 through an outlet water line 94 during operation to improve an efficiency of the turbofan engine 10, or more particularly, to cool one or more aspects of the turbofan engine 10. However, in other exemplary embodiments, the turbofan engine 10 may utilize such water for any other suitable purpose. For example, in other exemplary embodiments, the turbofan engine 10 may be configured to provide such water to, e.g., an aircraft into which the turbofan engine 10 is installed for various uses (e.g., passenger consumption, passenger sanitary uses, etc.).

It should also be appreciated, that the exemplary turbofan engine 10 of FIG. 2 is provided by way of example only. For example, in other exemplary embodiments, the turbofan engine 10 may have any other suitable configuration. For example, in other exemplary embodiments, the turbofan engine 10 may not be a geared turbofan engine 10 (i.e., may not include the power gearbox 46 mechanically coupling the fan 38 and the core turbine engine 16), may or may not be a ducted turbofan engine 10 (i.e., may not include a nacelle assembly enclosing the fan 38 and a portion of the core turbine engine 16), and may not be an ultra-high bypass turbofan engine 10 (i.e., may define a bypass ratio of less than about 8:1).

Figure 3:
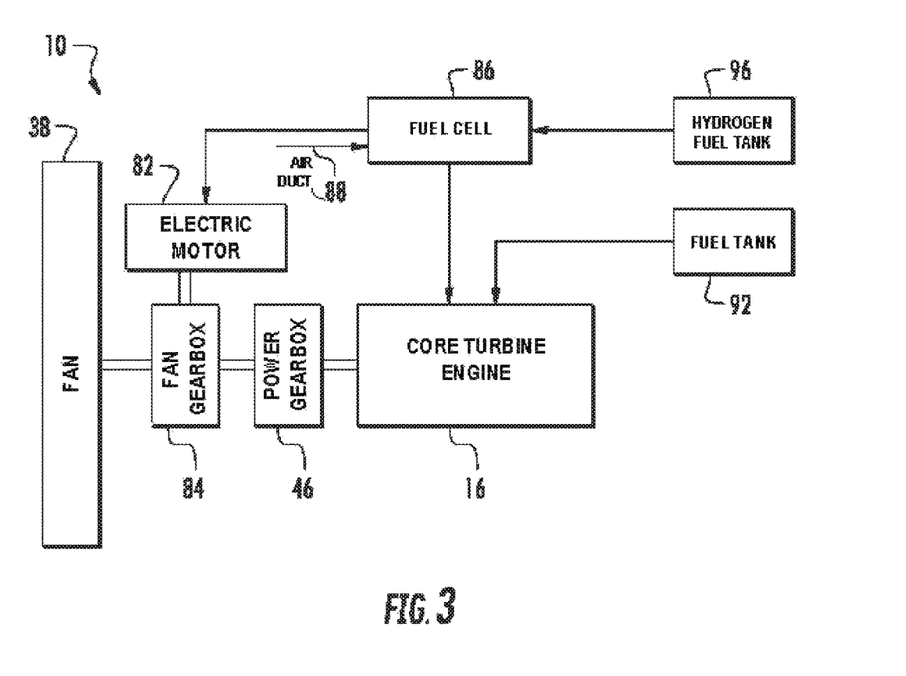
FIG. 3 is a schematic view of a gas turbine engine in accordance with yet another exemplary embodiment of the present disclosure.

Moreover, in other exemplary embodiments, the turbofan engine 10 may be configured to provide the chemically rechargeable ultra-capacitor 86 fuel in any other suitable manner. For example, referring now to FIG. 3, providing a schematic diagram of a turbofan engine 10 in accordance with another exemplary embodiment of the present disclosure, the turbofan engine 10 may include a separate, dedicated fuel source for the chemically rechargeable ultra-capacitor 86. Specifically, for the embodiment of FIG. 3, the turbofan engine 10 includes a hydrogen fuel tank 96 for providing hydrogen (i.e., hydrogen fuel) to the chemically rechargeable ultra-capacitor 86. Accordingly, the exemplary turbofan engine 10 of FIG. 3 does not include a reformer 90 positioned upstream of the chemically rechargeable ultra-capacitor 86 or in flow communication with a fuel tank 92 of the fuel system (c.f., FIG. 2). The turbofan engine 10 of FIG. 3 may in other respects, however, be configured in a substantially similar manner to the exemplary turbofan engine 10 of FIG. 2.

Further, in other exemplary embodiments, the aeronautical propulsion system may not be configured as a single turbofan or other gas turbine engine. For example, the aeronautical propulsion system may include a plurality of turbofan engines and a corresponding plurality of electric motors for driving the fans of such turbofan engines. Or, the aeronautical propulsion system may include a combination of one or more turbofan or other gas turbine engines and one or more other propulsion devices. For example, referring now to FIG. 4, an aeronautical propulsion system 100 in accordance with still another exemplary embodiment of the present disclosure is provided. Specifically, FIG. 4 provides a schematic, top view of an aircraft 102 having the exemplary aeronautical propulsion system 100 integrated therein.

Figure 4:
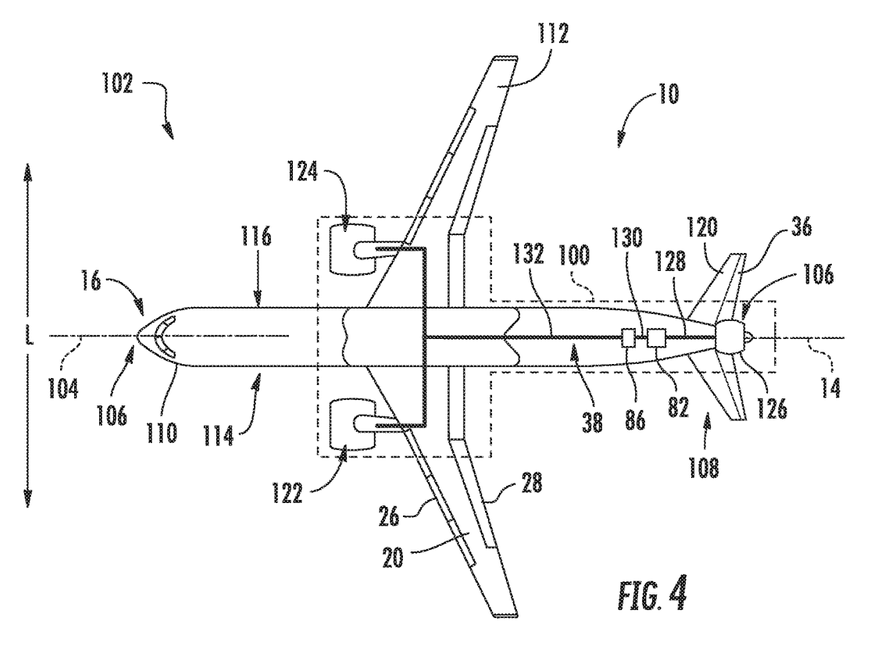
FIG. 4 is a top, schematic view of an aircraft incorporating an aeronautical propulsion system in accordance with an exemplary embodiment of the present disclosure.

As shown in FIG. 4, the aircraft 102 defines a longitudinal centerline 104 that extends therethrough, a forward end 106, and an aft end 108. Moreover, the aircraft 102 includes a fuselage 110, extending longitudinally from the forward end 106 of the aircraft 102 towards the aft end 108 of the aircraft 102, and a pair of wings 112. The first of such wings 112 extends laterally outwardly with respect to the longitudinal centerline 104 from a port side 114 of the fuselage 110 and the second of such wings 112 extends laterally outwardly with respect to the longitudinal centerline 104 from a starboard side 116 of the fuselage 110. The aircraft 102 further includes a vertical stabilizer (not shown) and a pair of horizontal stabilizers 120. It should be appreciated however, that in other exemplary embodiments of the present disclosure, the aircraft 102 may additionally or alternatively include any other suitable configuration of stabilizer.

The exemplary aeronautical propulsion system 100 of FIG. 4 includes a pair of gas turbine aircraft engines, at least one of which mounted to each of the pair of wings 112, and an aft engine. For the embodiment depicted, the gas turbine aircraft engines are configured as turbofan engines 122, 124 suspended beneath the wings 112 in an under-wing configuration—each turbofan engine 122, 124 including a fan and a turbine engine, also referred to as a core turbine engine (e.g., each of the turbofan engines 122, 124 may be configured in substantially the same manner as the turbofan engine 10 of FIG. 1). Additionally, the aft engine may be configured as a fan 126, or more specifically for the embodiment depicted, as a boundary layer ingestion fan configured to ingest and consume air forming a boundary layer over the fuselage 110 of the aircraft 102. The exemplary fan 126 depicted is fixedly connected to the fuselage 110 at the aft end 108, such that the fan 126 is incorporated into or blended with a tail section at the aft end 108. Accordingly, the fan 126 may be referred to as an "aft fan." However, it should be appreciated that in various other embodiments, the fan 126 may alternatively be positioned at any suitable location of the aft end 108.

In addition to the turbofan engines 122, 124 and the fan 126, the aeronautical propulsion system 100 depicted includes an electric motor 82 mechanically coupled, i.e., drivingly coupled to the fan 126 (via a shaft 128) and a chemically rechargeable ultra-capacitor 86 for providing electrical energy to the electric motor 82 (via an electrical line 130). The chemically rechargeable ultra-capacitor 86 depicted in FIG. 4 may be configured in substantially the same manner as the exemplary chemically rechargeable ultra-capacitor 86 described above with reference to FIG. 2 and/or below with reference to FIGS. 5 through 8. Notably, the exemplary aeronautical propulsion system 100 depicted is configured to direct the water generated by the chemically rechargeable ultra-capacitor 86 as a byproduct to one or both of the turbine engines of the turbofan engines 122, 124 via a water line 132. However, as discussed above, in other embodiments, the aeronautical propulsion system 100 may additionally, or alternatively, utilize such water for any other suitable purpose, or may expend such water to, e.g., to atmosphere.

Figure 5:
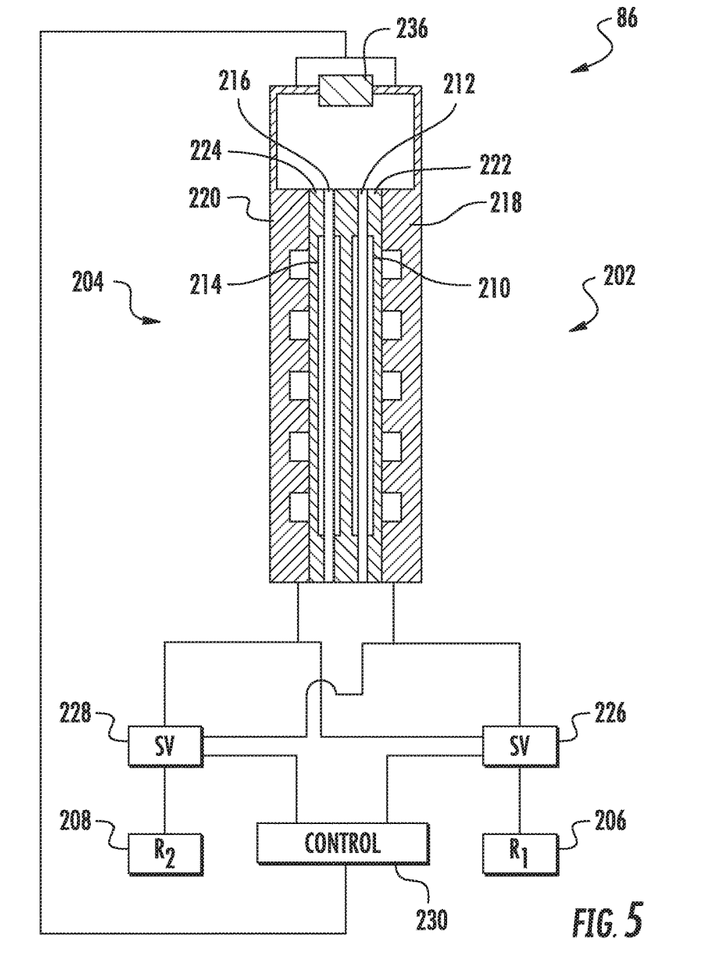
FIG. 5 is a schematic view of a chemically rechargeable ultra-capacitor in accordance with an exemplary embodiment of the present disclosure.

Referring now to FIG. 5, a schematic, close up view of a single cell of a chemically rechargeable ultra-capacitor 86 in accordance with an exemplary embodiment of the present disclosure is provided. The chemically rechargeable ultra-capacitor 86 may include a stack of single cells (such as the one depicted) allowing for the plurality of cells to build a desired voltage. Each cell of the plurality of cells may be sized to provide a desired amount of current or current density (Ampere/unit area). For the embodiment depicted, the cell of the chemically rechargeable ultra-capacitor 86 generally includes a first fuel cell portion 202 and a second fuel cell portion 204. Additionally the cell of the chemically rechargeable ultra-capacitor 86 is in communication with a first reactant supply 206 for providing a flow of a first reactant R1 and a second reactant supply 208 for providing a flow of a second reactant R2. The first reactant R1 may be hydrogen and the second reactant R2 may be air or oxygen. The first cell portion 202 includes a first catalytic electrode 210 and a first electrolytic or polarizable dielectric portion 212 interfaced with the first catalytic electrode 210. The second cell portion 204 similarly includes a second catalytic electrode 214 and a second electrolytic or polarizable dielectric portion 216 interfaced with the second catalytic electrode 214. The cell of the chemically rechargeable ultra-capacitor 86 is configured to inhibit substantially all transfer of ions (anions or cations) from the first electrolytic or polarizable dielectric portion 212 to the second electrolytic or polarizable dielectric portion 216. Additionally, first and second reactant distributors 218, 220 are provided in communication with first and second diffusion media electrodes 222, 224 to create a substantially uniform distribution of reactant gases over the first and second catalytic electrodes 210, 214.

The first and second reactant supplies 206, 208 are in communication with the first catalytic electrode 210 and the second catalytic electrode 214. More specifically, the cell of the chemically rechargeable ultra-capacitor 86 is configured to enable the first and second reactant supplies 206, 208 to communicate selectively with the first catalytic electrode 210 and the second catalytic electrode 214. For the exemplary embodiment depicted, the selective communication of the first and second reactant supplies 206, 208 with the first and second catalytic electrodes 210, 214 is attributable to alteration of the reactant supply flow paths. More particularly, for the embodiment depicted, the cell of the chemically rechargeable ultra-capacitor 86 includes a first solenoid valve 226 and a second solenoid valve 228. The first solenoid valve 226 is in flow communication with the first reactant supply 206 and selectively in flow communication with the first and second reactant distributors 218, 220. Additionally, the second solenoid valve 228 is in flow communication with the second reactant supply 208 and is also selectively in flow communication with the first and second reactant distributors 218, 220. Moreover, the first and second solenoid valves 226, 228 are operably connected to a controller 230, which is configured to selectively provide the first and second fuel cell portions 202, 204 with a flow of the first reactant R1 or the second reactant R2 by, e.g., actuating the first and second solenoid valves 226, 228.

Referring still to FIG. 5, during operation, the cell of the chemically rechargeable ultra-capacitor 86 essentially has two distinct operating stages. In a first operating stage, the first reactant R1 is hydrogen (H2) and is provided to the first reactant distributor 218. The hydrogen is separated into hydrogen protons and hydrogen electrons by the first catalytic electrode 210. Hydrogen protons are stored and hydrogen electrons leave the cell through the load 236 to the second cell portion 204. At this point, the chemically rechargeable ultra-capacitor 86 is positively charged. Additionally in the first operating stage, the second reactant R2 is air including oxygen (O2), and is provided to the second reactant distributor 220. The oxygen catalytically attracts the hydrogen electrons from the first reactant distributor 218, and becomes negatively charged and is stored at second cell portion 204, thus balancing the charge with first cell portion 202 storing positively charged hydrogen protons.

In a second operating stage 238, the first reactant R1, i.e., hydrogen, is instead provided to the second reactant distributor 220 and the second reactant R2, i.e., air including oxygen, is provided to the first reactant distributor 218. The hydrogen is separated into hydrogen protons and hydrogen electrons by the second catalytic electrode 214, which is already storing negatively charged oxygen. Hydrogen protons and oxygen cations react to form water (H2O) while electrons liberated by Hydrogen will migrate to the first cell portion 202 through load 236, attracted by Hydrogen protons already stored there. The hydrogen protons now recombine with electrons to make Hydrogen, which in turn combine with Air (containing O2) entering first cell portion 202 to make water (H2O).

The flow of electrons formed at first cell portion 202 and sent to second cell portion 204, and then reformed at the second cell portion 204 and re-sent to the first cell portion 202 creates the charge and discharge of the two fuel cells acting as a chemically rechargeable ultra-capacitor. The chemically rechargeable ultra-capacitor 86 moving from a charged, then discharged stage generates an alternating electric current and voltage across the load 236.

Figure 6:
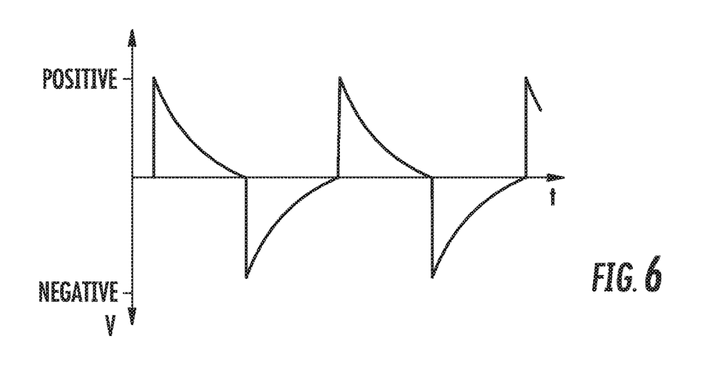
FIG. 6 is a graph depicting a voltage generated by the exemplary chemically rechargeable ultra-capacitor of FIG. 5.

Referring now to FIG. 6, a graph of a voltage that may be generated using the exemplary chemically rechargeable ultra-capacitor 86 described with reference to FIG. 5 is provided. As depicted, the chemically rechargeable ultra-capacitor 86 may generate a substantially continuous flow of alternating current electric energy across the load 236. More particularly, by operating in such a manner, the chemically rechargeable ultra-capacitor 86 may generate a flow of alternating current electric energy across the load 236 between a positive peak voltage and a negative peak voltage. The positive peak voltage may be greater than or equal to about 1.2 V, and the negative peak voltage may be less than or equal to about −1.2 V. Alternatively, in other embodiments, the positive peak voltage may be greater than or equal to about 1.6 V and the negative peak voltage may be less than or equal to about −1.6 V. The load 236 depicted may, in at least certain embodiments, be an electric motor (i.e., electric motor 82).

Notably, the chemically rechargeable ultra-capacitor 86 may store the electric charge by simply maintaining the chemically rechargeable ultra-capacitor 86 in a state where positively charged protons stored on one cell are counterbalanced by negatively charged electrons stored on the other cell. The rechargeable capacitor 86 is always charged, and switching flows between the two cell creates the charge-discharge curve shown in FIG. 6. The frequency of switching reactant flows changes the current and voltage charge/discharge frequency and amplitude. Accordingly, the chemically rechargeable ultra-capacitor 86 may be considered a "capacitor." Further, as the chemically rechargeable ultra-capacitor 86 is charged and recharged by a flow of fuel, the chemically rechargeable ultra-capacitor 86 may be considered "chemically rechargeable."

It should be appreciated, however, that the exemplary chemically rechargeable ultra-capacitor depicted in FIG. 5 is provided by way of example only, and that in other exemplary embodiments, the chemically rechargeable ultra-capacitor may have any other suitable configuration. For example, in other exemplary embodiments, the selective communication of the first and second reactant supplies 206, 208 with the first and second catalytic electrodes 210, 214 may be attributable instead to, e.g., movement of the first and second catalytic electrodes 210, 214. For example, referring now to FIGS. 7 and 8, a chemically rechargeable ultra-capacitor 86 in accordance with another exemplary embodiment of the present disclosure is provided. Except as described below, the chemically rechargeable ultra-capacitor 86 of FIGS. 7 and 8 may be configured in substantially the same manner as exemplary chemically rechargeable ultra-capacitor 86 of FIG. 5. Accordingly, the same or similar numbering may refer to the same or similar part.

Figure 7:
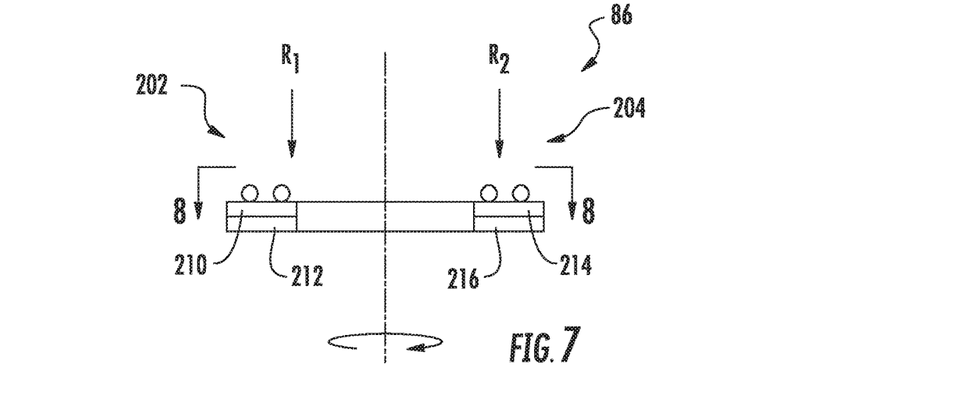
FIG. 7 is a first schematic view of a chemically rechargeable ultra-capacitor in accordance with another exemplary embodiment of the present disclosure.
Figure 8:
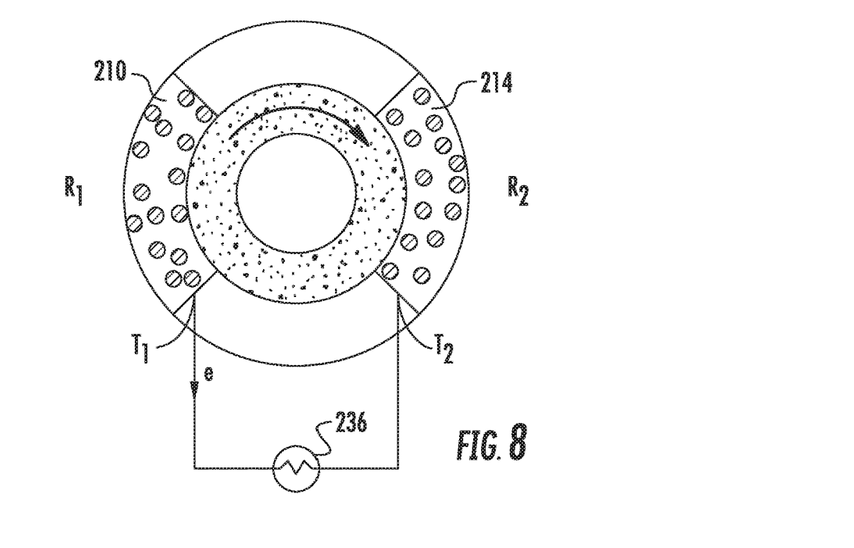
FIG. 8 is a second schematic view of the exemplary chemically rechargeable ultra-capacitor of FIG. 7.

The exemplary chemically rechargeable ultra-capacitor 86 of FIGS. 7 and 8 places a first and second reactant R1, R2 in selective communication with a first and second cell portion 202, 204 by moving a first and second catalytic electrode 210, 214. Specifically, the exemplary chemically rechargeable ultra-capacitor 86 depicted includes a layer of conductive material 242 that forms the first catalytic electrode 210 and the second catalytic electrode 214. The first and second catalytic electrodes 210, 214 are formed over an electrolytic support layer 244 that forms the first and second electrolytic portions 212, 216 of the chemically rechargeable ultra-capacitor 86.

The layer of conductive material 242 that forms the first catalytic electrode 210 and the second catalytic electrode 214 is referred to herein as a rotary electrode because it can be rotated through the two distinct reactant zones R1, R2 defined by the presence of reactants R1, R2. As the conductive layer rotates, portions of the layer of conductive material 242 are in substantially exclusive communication with the first reactant supply 206 and first reactant R1, while other portions of the layer of conductive material 242 are in substantially exclusive communication with the second reactant supply 208 and second reactant R2. At successive points of rotation of the rotary electrode, successive portions of the layer of conductive material 242 are in substantially exclusive communication with the first and second reactant supplies 206, 208 and first and second reactants R1, R2. The dynamic physical boundaries of the first catalytic electrode 210 are thus defined according to which portions of the conductive layer are in communication with the first reactant supply 206. Similarly, the dynamic physical boundaries of the second catalytic electrode 214 are defined according to which portions of the conductive layer are in communication with the second reactant supply 208. Reactions occurring at each electrode are as noted above in the description of the stationary electrode embodiments of the present disclosure (see FIG. 5), yielding current flow across the load 236 as electrons are collected and distributed at terminals represented schematically at T1 and T2. The terminals T1 and T2 are configured to collect electrons from the first catalytic electrode 210 and distribute ions on the second catalytic electrode 214 as the substantially planar rotary electrode structure rotates.

An aeronautical portion system in accordance with one or more the above embodiments may be configured to generate thrust in a more efficient manner. More particularly, inclusion of one or more aspects of the present disclosure may allow for an aeronautical propulsion system to increase its efficiency by utilizing a chemically rechargeable ultra-capacitor to efficiently generate electrical energy and an electric motor to convert such electrical energy to mechanical work for the propulsion system.

Figure 9:
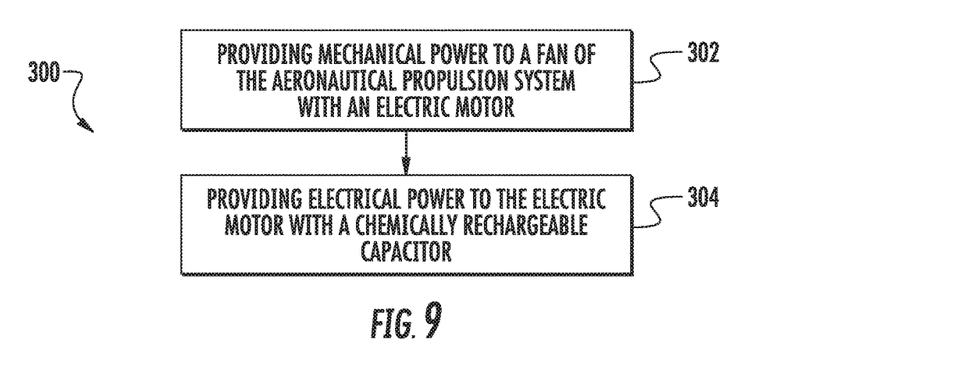
FIG. 9 is a flow diagram of a method for operating an aeronautical propulsion device in accordance with an exemplary aspect of the present disclosure.

Referring now to FIG. 9, a method (300) for operating an aeronautical propulsion system in accordance with one or more exemplary aspects of the present disclosure is provided. The exemplary method (300) depicted includes at (302) providing mechanical power to a fan of the aeronautical propulsion system with an electric motor. Additionally, the exemplary method (300) includes at (304) providing electrical power to the electric motor with a chemically rechargeable ultra-capacitor. In at least certain exemplary aspects, providing electrical power to the electric motor with a chemically rechargeable ultra-capacitor at (304) may include providing the electric motor with a substantially continuous flow of alternating current electrical power during operation. However, in other embodiments, providing electrical power to the electric motor with a chemically rechargeable ultra-capacitor at (304) may include providing the electric motor with a substantially continuous flow of direct current electrical power during operation.

Further, in certain exemplary aspects, providing electrical power to the electric motor with a chemically rechargeable ultra-capacitor at (304) may include providing electrical power to the electric motor during at least one of a takeoff operating mode, a climb operating mode, or a cruise operating mode. As discussed above, the takeoff operating mode and/or a climb operating mode may correspond to a takeoff operating mode and/or climb operating mode of an aircraft into which the aeronautical propulsion system is installed. Similarly, the cruise operating mode may correspond to a cruise operating mode of an aircraft into which the aeronautical propulsion system is installed.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gas turbine engine comprising:
   a core engine;
   a fan mechanically coupled to the core engine;
   an electric motor drivingly connected to at least one of the core engine and the fan;
   a nacelle defining a bypass passage;
   an air duct in airflow communication with the bypass passage
   a first reactant supply line;
   a second reactant supply line configured to receive a flow of air from the air duct; and
   a chemically rechargeable ultra-capacitor for providing the electric motor with a substantially continuous flow of electric energy during operation of the chemically rechargeable ultra-capacitor, the chemically rechargeable ultra-capacitor fluidly coupled to the first reactant supply line and the second reactant supply line for receiving a first reactant from the first reactant supply line and a second reactant from the second reactant supply line during operation, the second reactant being the flow of air from the air duct.

2. The gas turbine engine of claim 1, wherein the chemically rechargeable ultra-capacitor is rechargeable by a fuel through the first reactant supply line, and wherein the fuel is at least one of hydrogen, liquefied natural gas, compressed natural gas, liquefied hydrogen, syngas, aviation turbine fuel, or reformate.

3. The gas turbine engine of claim 1, wherein the chemically rechargeable ultra-capacitor provides the electric motor with a substantially continuous flow of alternating current electrical power during operation of the chemically rechargeable ultra-capacitor.

4. The gas turbine engine of claim 1, wherein the chemically rechargeable ultra-capacitor comprises a first cell portion having a first catalytic electrode and a second cell portion having a second catalytic electrode, wherein the chemically rechargeable ultra-capacitor is in communication with a first reactant supply through the first reactant supply line and a second reactant supply through the second reactant supply line, and wherein the chemically rechargeable ultra-capacitor enables the first and second reactant supplies to selectively communicate with the first catalytic electrode of the first cell portion and the second catalytic electrode of the second cell portion.

5. The gas turbine engine of claim 1, further comprising:
   a fuel tank; and
   a reformer in flow communication with the fuel tank and the chemically rechargeable ultra-capacitor, wherein the reformer is configured to receive a flow of fuel from the fuel tank and provide a flow of at least one of hydrogen, syngas, or reformate to the chemically rechargeable ultra-capacitor through the first reactant supply line.

6. The gas turbine engine of claim 5, wherein the fuel tank is also in flow communication with the core engine.

7. The gas turbine engine of claim 1, further comprising:
   a hydrogen fuel tank in flow communication with the chemically rechargeable ultra-capacitor.

8. The gas turbine engine of claim 1, wherein the chemically rechargeable ultra-capacitor provides the electric motor with a substantially continuous flow of electric energy during at least one of a takeoff operating mode, a climb operating mode, or a cruise operating mode.

9. The gas turbine engine of claim 1, wherein the electric motor is drivingly connected to the fan through a mechanical coupling unit.

10. An aeronautical propulsion system comprising:
a fan having a plurality of fan blades;
an electric motor drivingly connected to the fan for rotating the plurality of fan blades;
a nacelle at least partially surrounding the fan and defining an airflow passage;
an air duct in airflow communication with the airflow passage for receiving a flow of air from the airflow passage;
a first reactant supply line;
a second reactant supply line configured to receive the flow of air from the air duct; and
a chemically rechargeable ultra-capacitor for providing the electric motor with a substantially continuous flow of electric energy during operation, the chemically rechargeable ultra-capacitor fluidly coupled to the first reactant supply line and the second reactant supply line for receiving a first reactant from the first reactant supply line and a second reactant from the second reactant supply line during operation.

11. The system of claim 10, wherein the electric motor is drivingly connected to the fan through a mechanical coupling unit.

12. The system of claim 10, wherein the chemically rechargeable ultra-capacitor is rechargeable by a fuel provided through the first reactant supply line, and wherein the fuel is at least one of hydrogen, syngas, or reformate.

13. The system of claim 10, wherein the chemically rechargeable ultra-capacitor is configured to provide the electric motor with a substantially continuous flow of alternating current electrical power during operation.

14. The system of claim 10, further comprising:
a fuel tank; and
a reformer in flow communication with the fuel tank and the chemically rechargeable ultra-capacitor, wherein the reformer is configured to receive a flow of fuel from the fuel tank and provide a flow of at least one of hydrogen, syngas, or reformate to the chemically rechargeable ultra-capacitor.

15. The system of claim 14, wherein the fan is an aft fan configured to be mounted at an aft end of an aircraft incorporating the aeronautical propulsion device.

16. The system of claim 10, wherein the chemically rechargeable ultra-capacitor comprises a first cell portion having a first catalytic electrode and a second cell portion having a second catalytic electrode, wherein the chemically rechargeable ultra-capacitor is in communication with a first reactant supply and a second reactant supply, and wherein the chemically rechargeable ultra-capacitor enables the first and second reactant supplies to selectively communicate with the first catalytic electrode of the first cell portion and the second catalytic electrode of the second cell portion.

17. A method for operating an aeronautical propulsion system, the method comprising:
providing mechanical power to a fan of the aeronautical propulsion system with an electric motor; and
providing electrical power to the electric motor with a chemically rechargeable ultra-capacitor, wherein providing electrical power to the electric motor comprises switching a flow of a first reactant to a first cell portion of the chemically rechargeable ultra-capacitor and a flow of a second reactant to a second cell portion of the chemically rechargeable ultra-capacitor to recharge the chemically rechargeable ultra-capacitor, the second reactant being a flow of air from an air duct in airflow communication with a bypass passage.

18. The method of claim 17, wherein providing electrical power to the electric motor with a chemically rechargeable ultra-capacitor includes providing the electric motor with a substantially continuous flow of alternating current electrical power during operation.

19. The method of claim 17, wherein providing electrical power to the electric motor with a chemically rechargeable ultra-capacitor includes providing electrical power to the electric motor during at least one of a takeoff operating mode, a climb operating mode, or a cruise operating mode.

20. The gas turbine engine of claim 1, wherein the nacelle surrounds at least a portion of the fan and the core engine and defines the bypass passage with the core engine, and wherein the gas turbine engine further comprises:
a fuel tank in flow communication with the core engine for providing a flow of fuel to the core engine; and
a reformer also in flow communication with the fuel tank and the chemically rechargeable ultra-capacitor, wherein the reformer is configured to receive a flow of fuel from the fuel tank and provide a flow of at least one of hydrogen, syngas, or reformate to the first reactant supply line and the chemically rechargeable ultra-capacitor.

* * * * *